March 12, 1963     E. C. KAST     3,081,088
GAME APPARATUS
Filed July 3, 1959
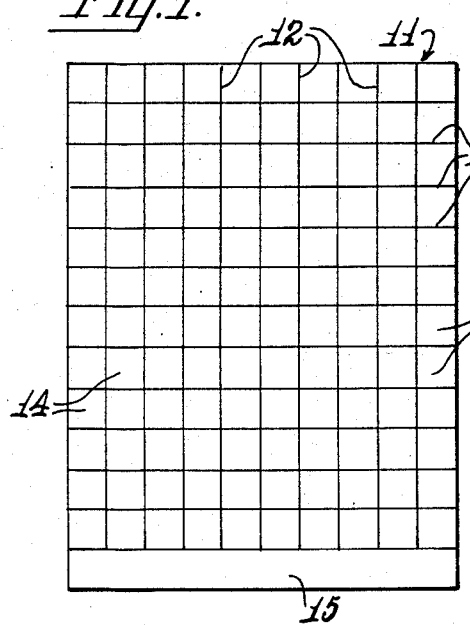
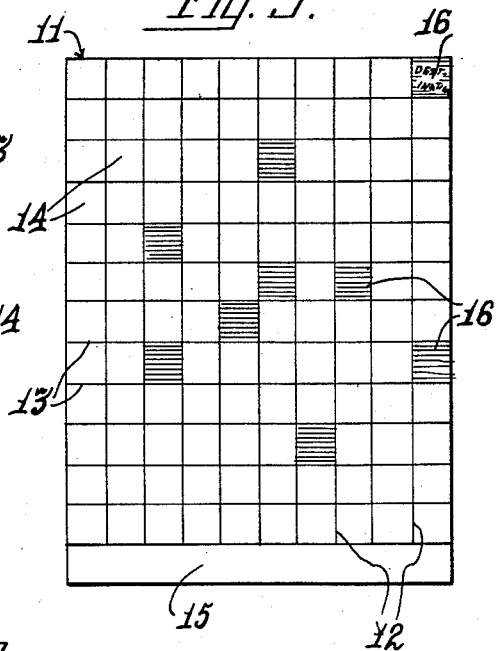
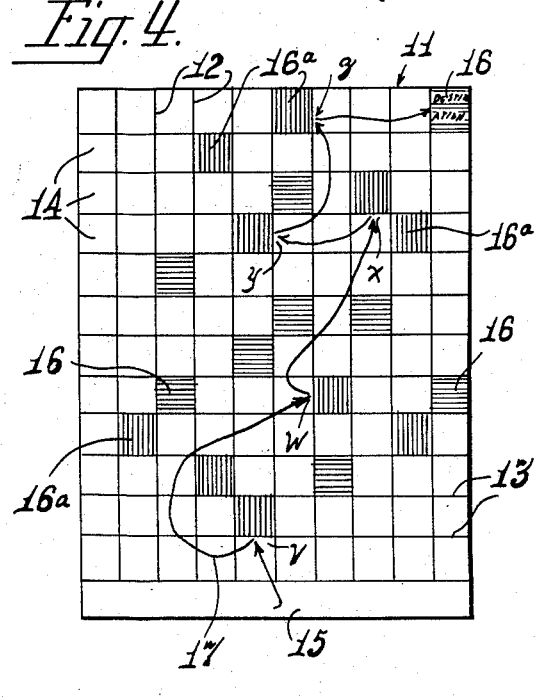
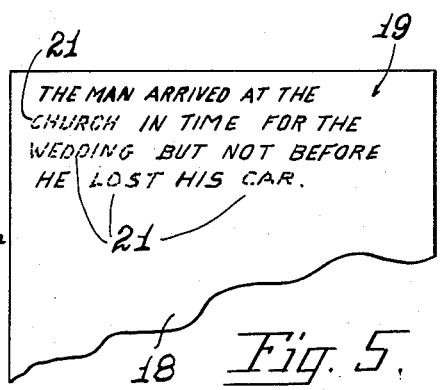
INVENTOR.
Eric C. Kast
BY
Attr.

3,081,088
GAME APPARATUS
Eric C. Kast, 1633 E. Hyde Park Blvd., Chicago, Ill.
Filed July 3, 1959, Ser. No. 824,802
3 Claims. (Cl. 273—130)

The invention relates generally to game apparatus, and is more particularly concerned with a game apparatus of a character wherein selected parts thereof are rendered invisible to a player seeking to effect a particular result during play.

The features of the invention may be incorporated into many different types of game apparatus, such as, for example, an obstacle game, a game involving sentence composition, or a question and answer game. It is primarily concerned with the provision of a playing field or card upon which there is one or more objects or words that are rendered invisible to a player viewing the same through a colored transparency. In the instance of an obstacle game, such invisible objects must be avoided while a player is tracing a path across the playing field. In the instance of a sentence composition game, the player must supply a word or words to replace such words in a sentence as are made invisible to him. In the instance of a question and answer game, the player must supply the invisible answer to questions which are visible to him. The colored transparency may consist of a colored transparent sheet arranged in a manner to shield the playing board or card from the active player, or it may consist of a pair of spectacles having colored lenses and which are worn by the active player.

In one embodiment of the invention herein disclosed, there is provided a playing board upon which one of two players, hereinafter termed the "attacker," arranges a number of playing pieces representative of hazards, and a place of "destination." He then arranges the transparency of a predetermined color before his eyes, and the other player, or "defender," arranges a like number of playing pieces representative of hazards and of a color corresponding to the color of the transparency, and which are therefore invisible to the "attacker," on the playing field in positions which the "defender" believes will make the play, hereinafter discussed, by the "attacker" more difficult. The "attacker" then attempts to trace a path from a starting position across the playing board to the "destination" by use of any suitable marking implement, such as a black pencil. In doing so, he will avoid the visible hazards placed by himself, and in so doing may attempt to cross over one or more of the hazards which are invisible to him. Should that occur, he is advised and he then must resume seeking a path around the said invisible hazards and across the playing board, or, under another set of rules, the "attacker" may continue tracing his path towards the "destination" and the "defender" will be credited with points by virtue of the "attacker's" mistake in crossing the hazard. Under still different rules, the "attacker's" hazards are rendered invisible to the "defender," who is wearing a pair of spectacles in color identical to the color of the "attacker's" hazards, and the players switch their relative positions of "defender" and "attacker."

Although scoring may be effected in various manners, one system of scoring would be to charge the active player with one point each time he encounters an invisible hazard. When the "attacker" reaches the "destination" the points are totaled by visual observation of the pencil marks and hazards on the boards. The marked sheets then may be discarded, and the playing pieces are rearranged randomly on another like sheet by the players who have reversed their positions and the play is repeated. After the second player has completed his play and his score tallied, the person having the lowest number of points is declared the winner.

In another embodiment herein disclosed, a stack of cards is provided, each bearing one or more sentences in each of which one or more key words are printed in a color responding to the color of the transparency used by the active player. The transparency may be a sheet or the lenses of a pair of spectacles. When the sentence is viewed through the transparency, the similarly colored key words are invisible. The player then is required to suggest words for insertion in the apparent blank spaces so as to complete a sentence. The end result is the composition of the original sentence or an unusual and unexpected sentence structure. Scoring may be based upon the percentage of correct word suggestions.

A question and answer game can be played in a similar fashion to the sentence composition game, except that in such a case, the questions are visible to the active player, but the answers are not, in that they are printed on the card in a color like the color of the transparency. Scoring may be based upon the number of questions answered correctly.

It is therefore an object of the invention to provide novel game apparatus.

Another object of the invention is to provide a game of a character wherein selected components thereof are invisible to one of the players.

Still another object of the invention is to provide a combination of game components of such character that a player is required to reach a desired result while some of the component elements are not visible to him.

With the foregoing and other objects in view, which will appear as the description proceeds, the invention consists of certain novel features of construction, arrangement and a combination of parts hereinafter fully described, illustrated in the accompanying drawings, and particularly pointed out in the appended claims, it being understood that various changes in the arrangement, form, proportion and minor details of the structure may be made without departing from the spirit or sacrificing any of the advantages of the invention.

For the purpose of facilitating an understanding of the invention, there is illustrated in the accompanying drawings preferred embodiments thereof, from an inspection of which, when considered in connection with the following description, the invention, its mode of play, construction and assembly and many of its advantages should be readily understood and appreciated.

Referring to the drawings in which the same characters of reference are employed to indicate corresponding or similar parts throughout the several figures of the drawings:

FIGURE 1 is a plan view of a game board embodying features of the present invention.

FIGURE 2 is a view of a representative one of a number of substantially like playing pieces for use on the board shown in FIGURE 1.

FIGURE 3 is a view similar to FIGURE 1, showing the playing pieces comprising one set of playing pieces arranged on the board.

FIGURE 4 is a view similar to FIGURE 3, showing the playing pieces of both sets of playing pieces arranged on the board.

FIGURE 5 is a representative playing card embodying another embodiment of the invention.

Referring to the disclosure in the accompanying drawings, and particularly to FIGURES 1 through 4, which illustrate a hazard-type game, there may be provided a plurality of like playing boards (only one shown) each in the form of a rectangular sheet of paper 11, having intersecting lines 12 and 13 thereon defining an overall pattern of substantially square areas 14 and a starting area 15 at one end thereof, and from which the play, hereinafter described, is initiated. The game is intended to be played by two players, one of whom is identified as an "attacker" and the other a "defender." Each player is supplied with a set of playing pieces 16—16a, one piece of which is shown at 16 in FIGURE 2.

The set of playing pieces 16 acquired by the "attacker" are, in this instance, green in color, and they may bear representations of military offensive equipment, such as, for example, tanks, artillery, boats, etc.

The set of playing pieces 16a acquired by the "defender" are red in color, and each piece may bear representations of such military obstacles as tank traps, forts, infantry, mountains, lakes, etc. The "attacker" is also furnished with a red colored transparency, such as a pair of spectacles having red tinted lenses, and a marking implement.

The player designated the "attacker," and who is the active player, will initially arrange his green colored playing pieces 16 in selected areas 14 such as are illustrated in FIGURE 3. One of the said pieces is designated "destination" and this piece is placed at the end of the board opposed to the starting area 15. Should the player not be wearing the red tinted glasses, he will then put them on; or, if the game is to be played as a game of skill, rather than as a game of chance, the "attacker" will not put on the glasses until the "defender" has arranged the red playing pieces, and the skill of the "attacker" in recalling the location of such pieces during play will be tested.

The "defender" arranges a like number of red colored playing pieces 16a in selected areas 15 not occupied by the playing pieces 16 and in such a manner as to obstruct a clear path across the board from the starting area 15 to the "destination." The playing board and the playing pieces thereon will appear substantially as illustrated in FIGURE 4. The playing pieces 16a are invisible to the "attacker" who must view the playing board through the spectacles or some other colored transparency which may be made available instead of spectacles.

The "attacker" now seeks to trace a path 17 across the playing board from the starting area 15 to the "destination." Preferably, a marking element such as a black pencil is used so that the path traced is visible to both players. In the event the "attacker," while tracing such a path, carries the path into contact with one of the invisible playing pieces 16a, as indicated at v in FIGURE 4, the "attacker" is informed of that fact by an audible or visual signal such as a buzer or light (not shown) under the control of the "defender." When this occurs, the "attacker" stops his advance and seeks another route across the board. In so doing, he may, for example, successively encounter other red playing pieces 16a as illustrated at w, x, y and z, before arriving at the "destination." This completes the "attacker's" play, and the total number of contacts is tallied.

The playing pieces are then rearranged on another sheet 11, and the play is repeated with the positions of the players reversed. Successive plays may be effected until each player has had a predetermined number of plays, and the respective scores are tallied. The playing boards 11 may be reused by erasing or otherwise removing the path markings of a previous play. As an alternate form of play, the playing pieces may be dispensed with and the obstacles may be indicated by marking selected areas with colored pencil or the like. If the playing pieces are of substantial thickness so that the shadow of the obstacles discloses their locations when viewing the board throught the transparency, the intersecting lines 12 and 13 should be drawn at least as heavy as the thickness of the pieces, so that the areas 14 of the entire board appear to have uniform shadows when the pieces are placed on the board.

Also, both players can be "active" players, if the player positioning the green obstacles has on red colored spectacles, and the player positioning the red obstacles has on green colored spectacles, in which case the obstacles of each player would not be visible to his opponent, and each player would take turns in attempting to reach the "destination."

It should also be noted that the game can be played with only one player, in which case that player would arrange the red obstacles on the board, attempt to memorize their location, put the red colored transparency into position so that the red colored obstacles would be invisible to him, and attempt to trace a path to the "destination" without crossing the areas in which the red obstacles are situated.

In FIGURE 5, there is illustrated another embodiment of a game utilizing the principle of the invention. As there shown, a card 18, which is one of a stack of cards, has imprinted thereon one or more sentences 19, in which selected key words 21 are colored to respond to the color of a transparency, such as the lenses of a pair of spectacles, so as to be invisible to a player viewing the same through the transparency. In the example shown, the words "church," "wedding," "lost," and "car" respond to the color of the transparency, and the play is such that the player must supply the missing words. In so doing, he may compose a sentence structure having an entirely different meaning. This game may be played for the amusement of the participants, or it may be scored according to the correct words supplied or the novelty or originality of the sentence composed.

Obviously, the concept of the invention may be incorporated into other types of game apparatus, such as those based upon various sporting events or intellectual contests, without departing from the spirit of the invention.

I claim:

1. A game comprising a playing board, a first set of playing pieces of a predetermined color randomly arranged on said board, a second set of playing pieces of a different color randomly arranged on said board, a pair of spectacles adapted to be worn by a player and containing transparent filters both of a color to transmit the color of one of the sets of playing pieces but not the other set, and a tracing implement adapted to be used by said player seeking to trace a path across the playing board without encountering said other set of playing pieces, said instrument leaving a mark on said playing board that is visible to the player.

2. A game comprising a first set of playing pieces of a predetermined color adapted to be randomly arranged on a surface, a second set of playing pieces of a different color adapted to be randomly arranged on said surface, a pair of spectacles adapted to be worn by a player and containing transparent filters both of a color to transmit the color of one of the sets of playing pieces but not the color of the other set, and a marking implement adapted to be used by said player for marking a path across said surface without encountering said other set of playing pieces.

3. A game comprising a playing board having "start" and "objective" markings thereon, a first set of playing pieces of a predetermined color each representing a hazard, a second set of playing pieces of a different predetermined color each representative of a hazard, said playing pieces being randomly arranged on a playing board, a pair of spectacles adapted to be worn by a player and containing transparent filters both of a color to transmit the color of said first set of playing pieces but not the color of said second set of playing pieces, and an instrument adapted for use by the player in tracing a path across the playing board from the "start" to the "objective" markings without encountering any of the hazards.

References Cited in the file of this patent

UNITED STATES PATENTS

| | | |
|---|---|---|
| 1,282,513 | Withington | Oct. 22, 1918 |
| 2,100,421 | Wupper | Nov. 30, 1937 |
| 2,290,266 | Bechtold | July 21, 1942 |
| 2,837,836 | Morawitz | June 10, 1958 |
| 2,840,073 | Zeltzer | June 24, 1958 |

FOREIGN PATENTS

| | | |
|---|---|---|
| 607,217 | Great Britain | Aug. 27, 1958 |

OTHER REFERENCES

Aero Digest for July 1943, page 295 cited.